United States Patent Office
2,771,203
Patented Nov. 20, 1956

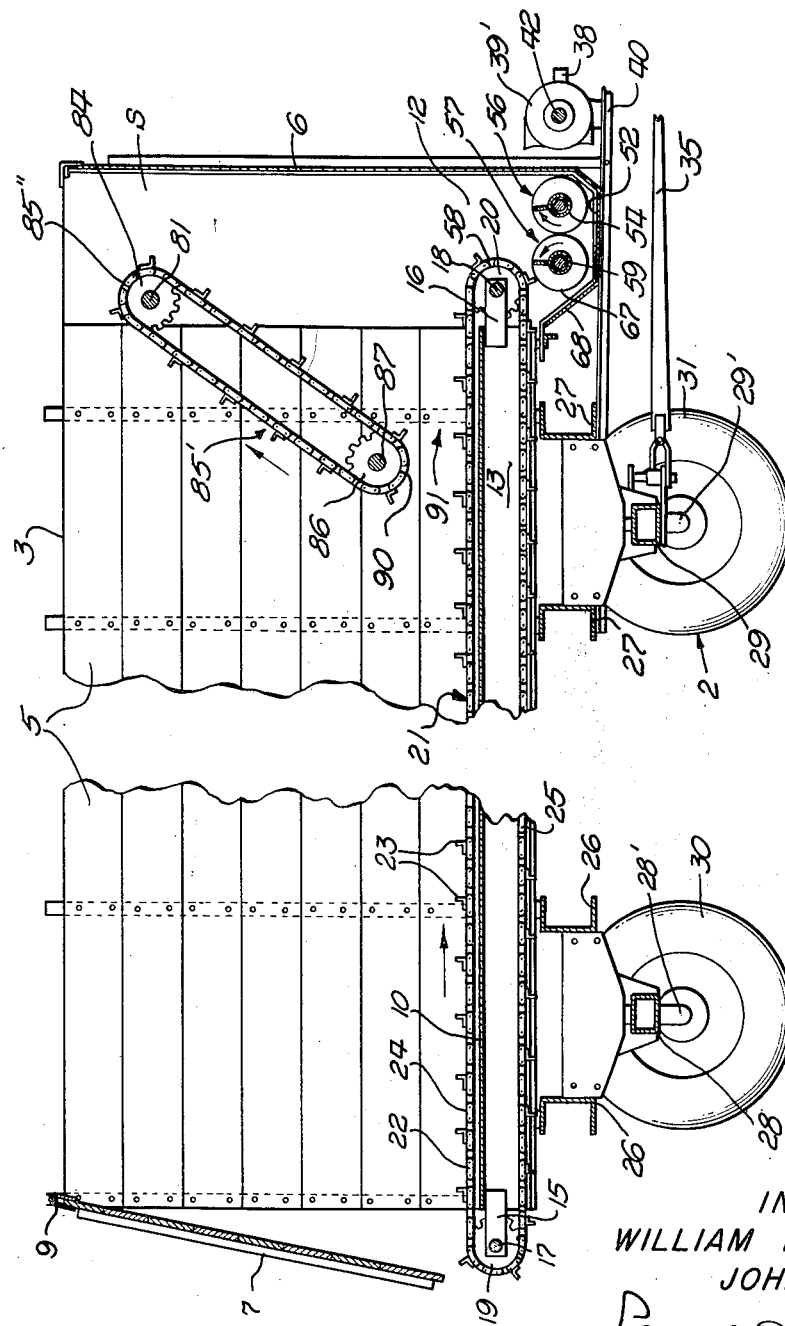

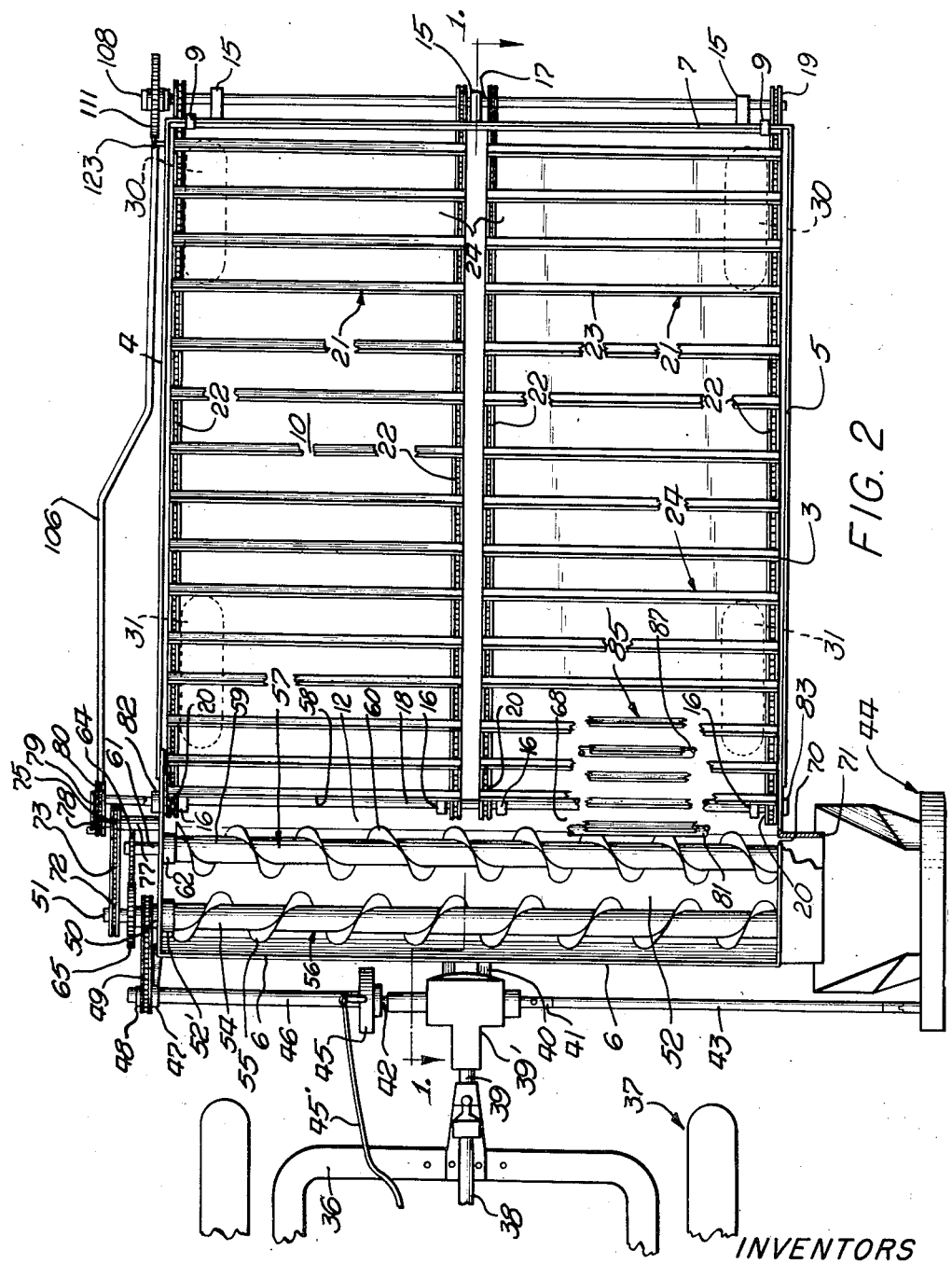

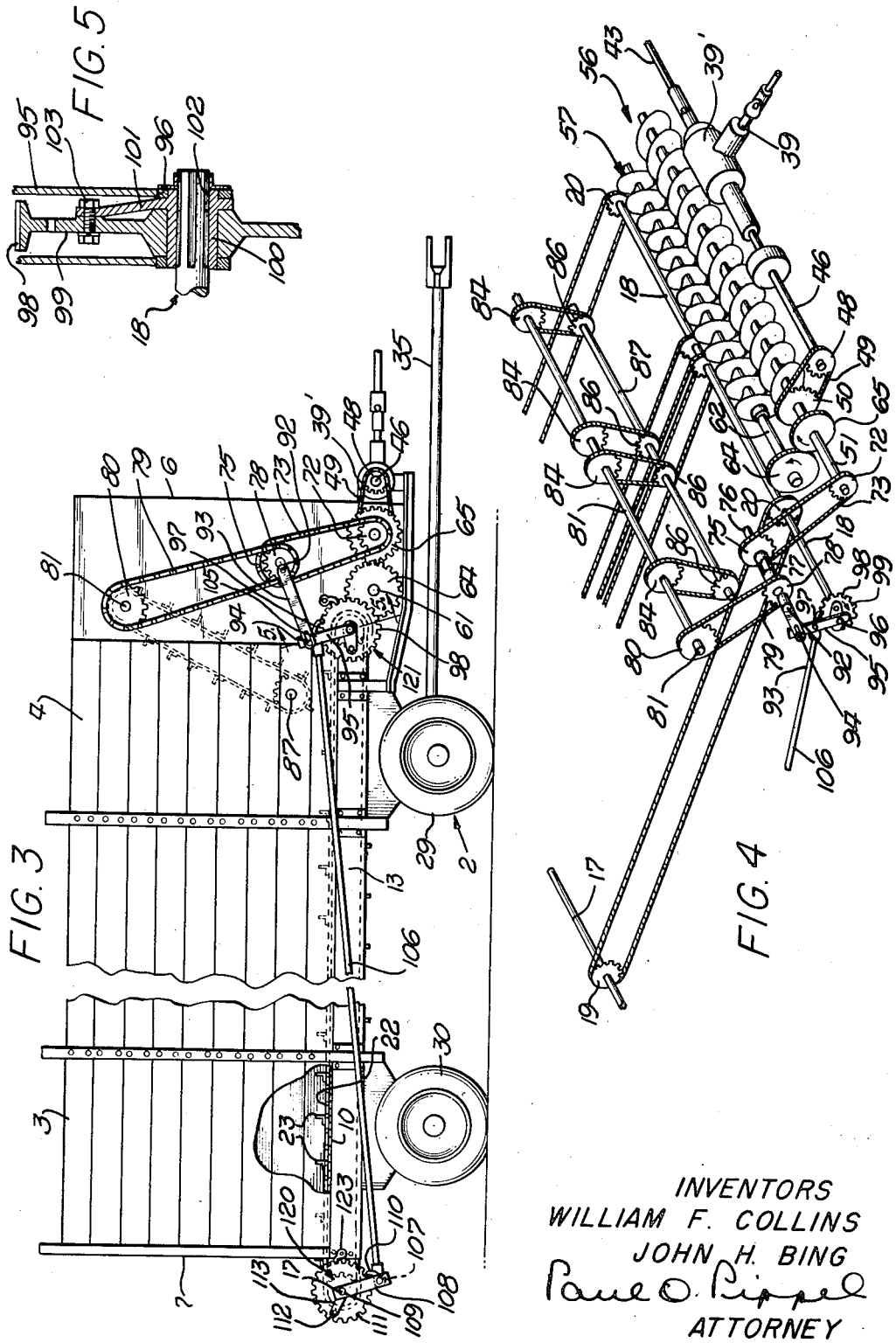

2,771,203

VEHICLE WITH SELF-UNLOADING MECHANISM

William F. Collins and John H. Bing, Downers Grove, Ill., assignors to International Harvester Company, a corporation of New Jersey Application February 24, 1955, Serial No. 490,173

6 Claims. (Cl. 214—519)

This invention relates to self-unloading vehicles and more specifically to a novel vehicle for unloading in either of several directions.

A general object of the invention is to provide a novel and simple self-unloading vehicle wherein the parts are arranged in a compact and efficient manner.

A more specific object of the invention is to provide a self-unloading vehicle which incorporates a bed conveyor adapted to discharge either forwardly or rearwardly with respect to its associated wagon box, the forward discharge being re-routed to a side discharge through a side of the wagon by twin conveyor screws and the rate of discharge being controlled by a stripper conveyor.

These and other objects of the invention will become more apparent from the specification and the drawings, wherein:

Figure 1 is a longitudinal sectional view of the novel self-unloading vehicle taken substantially on the line 1—1 of Figure 2;

Figure 2 is a fragmentary plan view of the vehicle shown in Figure 1;

Figure 3 is a side elevational view with the rear portion of the wagon being broken away in order to more clearly show that construction;

Figure 4 is a diagrammatic perspective view of the driving arrangement for the various conveyor components, and Figure 5 is a fragmentary vertical sectional view taken substantially on the line 5—5 of Figure 3.

Describing the invention in detail, the vehicle generally designated 2 comprises a box 3 including laterally spaced longitudinal sides 4 and 5 and an upright interconnecting front wall 6. The rear end of the wagon is closed by a gate 7 which in closed position extends upright between the walls 4 and 5 and is swingably suspended at its upper end on a hinge assembly 9 and the gate is swingable between closed and opened positions as shown in Figure 1. The box incorporates a bottom 10 which is spaced at its forward extremity from the front wall 6 to define a discharge opening 12 (Figure 1) therewith and the bottom panel 10 is supported by longitudinal sill members 13. The opposite ends of sills 13 are connected to brackets 15 and 16, on which are journalled transverse rear and front sprocket shafts 17 and 18 for the rear and front sprocket assemblies 19 and 20 respectively.

A pair of endless chain-type bed conveyors 21, 21 is stretched between and about the front and rear sprocket assemblies 19 and 20 and each comprises a pair of side chains 22 interconnected by transverse bars or slats 23 and having a top run 24 running over the bottom 10 and the bottom run 25 passing under the bottom 10 and over the rear bolster members 26 and the front bolster members 27 which are connected to the members 13 and respectively support the rear bolster element 28 and the front bolster element 29, the latter connected to the spindles 28', 29' which mount rear wheels 30 and front wheels 31.

Front bolster assembly 29 is connected to a shaft or hitch member 35 which is adapted for connection to a drawbar 36 (Figure 2) of a tractor generally designated 37 and from which extends a power take-off 38 in the form of a shaft which connects to an input shaft 39 of a gear box 39' mounted on a bracket 40 carried from the front wall and bottom of the box in substantially central relationship to the box. The gear box has a pair of transversely extending output shafts 41 and 42, the shaft 41 being adapted for coupling with the shaft 43 of a blower 44 which may be positioned at one side of the wagon box 2 as hereinafter described.

The other output shaft 42 is connected through a clutch assembly 45 to a coaxial shaft 46 which is carried on a bearing 47 connected to the box 2 and extending outwardly of the side 4 of the box and thereat is provided with a sprocket 48 which is keyed thereto and constrained for rotation therewith and driving a chain 49 which drives a sprocket 50 of an auger shaft 51 which is supported by a bearing assembly 52' from the wall 4 at one end of a trough structure 52 which extends lengthwise transversely of the box at its forward bottom corner. The shaft 51 supports an auger core 54 which is connected to a flight 55 of sinistrorsal convolution. The forward auger generally designated 56 extends the full length of the trough and cooperates with a rearward auger 57 extending generally parallel thereto along and forwardly from beneath the forward discharge extremity 58 of the bed conveyor. The rear auger is provided with a core 59 about which a spiral dextrorsal flight 60 is connected and the core is connected to a shaft 61 which is journalled in a bearing structure 62 carried by the wall 4 of the box. The shaft 61 is keyed to a gear 64 which meshes with a companion gear 65 which is keyed to the shaft 50 of the forward auger 56. Therefore it will be realized that the revolution or location of the auger 56 which is to the right as seen in Figure 1 and that the auger 57 is to the left and it will be realized from a consideration of Figure 1 that the rear side of the auger designated 67 sweeps the crops off the forward discharge end of the bed conveyor downwardly against the back side or paneling 68 of the trough 52 and that the two augers move at adjacent regions upwardly so as not to wedge the material therebetween that is entered between the cooperating flights which are disposed in cooperating relationship with each other. The augers are at a level below the bed conveyor. The rotation of these auger flights as indicated by the arrows will, of course, discharge the crops through the discharge opening 70 in the side 3 of the box and into a chute 71 which surrounds the opening 70 and forms an outward extension in regard to the trough and the opening 70.

The auger shaft 51 of the front auger is connected to a sprocket 72 which drives a chain 73 which in turn drives a sprocket 75 which is rotatively mounted on a countershaft 76 which is carried by the wall 4 of the box. The sprocket 75 which revolves on the shaft 76 is connected by a sleeve 77 to a coaxial sprocket 78 which in turn drives a chain 79 which is turned about and drives a sprocket 80 which is keyed to a shaft 81 which extends the width of the box in close proximity to the top edge thereof and is journalled on bearings 82 and 83 which are mounted on the walls 4 and 3 respectively. The shaft 81 drives a series of sprockets 84 which drive endless chain slat-type stripper elevator conveyor aprons 85 which at their upper extremities extend over the shaft 81 and at their lower extremities under and about sprocket assemblies 86 which are mounted on the shaft 87 which extends through the slides 4 and 3 of the box and carried in suitable bearings thereon at a level spaced a predetermined distance above the bed conveyor to provide with the lower intake end 90 a passage 91 for the last increment of the crops which would be carried by the bed conveyors underneath as shown by the arrows, Figure 1, to the trough 52 when discharged forwardly.

The sprocket 78 is provided with a crank or eccentric 92 which drives a pitman 93 which is operatively connected as at 94 to the upper end of an arm assembly 95 which at its lower end is journalled as at 96 about the forward bed conveyor shaft 18.

The arm assembly 95 carries intermediate its ends a spring pressed driving pawl 97 which engages the teeth 98 of a ratchet wheel 99 which with the arm assembly 95 and the crank means 93 defines a step by step transmission for driving the bed conveyor in the forward direction. The ratchet wheel 99 is rotatable relative to the shaft 18 on a sleeve 100 of a clutch member 101 (Figure 5) which has a splined connection at 102 to the shaft 18, and the clutch member 101 being in the form of a spider which is selectively attachable by means of nut and bolt assemblies 103 to the ratchet wheel 99 when it is intended to drive the bed conveyor forwardly as hereinafter explained.

The arm assembly 95 is connected as at 105 to one end of a pull rod 106 which at its opposite end is pivoted as at 107 (Figure 3) to the lower end of an arm 108 which is substantially identical with the assembly 95. The arm assembly 108 is pivoted as at 109 on the shaft 17 and through the medium of the spring pressed operating pawl 110 drives the ratchet wheel 111 in a counterclockwise direction, Figure 3, as shown by the arrows. When it is intended to drive the bed conveyor rearwardly, the clutch or connecting means 103 of the forward step by step transmission between the driven member 101 with the driving member 99, Figure 5, is disconnected, and the ratchet wheel 111 is similarly connected as at 112 to an arm of a driven member 113 which is splined to the shaft 117. This alternative drive of the bed conveyor is more fully shown and described and claimed in U. S. Patent 2,750,059, granted June 12, 1956 in the names of Otto E. Hintz et al.

*Mode of operation*

Assuming that the rear step by step transmission indicated generally 120 is disconnected and that the front step by step transmission generally designated 121 is connected, the drive is initiated from the powershaft 38 (Figure 2) which delivers the power through the shaft 39 to the gear box 39' and from there to the output shafts 41 and 42. The output shaft 41 being connected, if it is intended to discharge the crop into a silo to the shaft 43 of the blower 44 which is positioned at the discharge chute 71 of the box.

The shaft 42 which is connected to the clutch 45 drives the shaft 46 of the driven part of the clutch and the clutch 45 may be manually engaged and disengaged, in accordance with conditions by means of an operating linkage 45' which may include a cable which extends to the operator's station as will be readily understood by those skilled in the art. The shaft 46 drives the sprocket 48 which in turn drives the chain 49 thus the sprocket 50 of the auger 56 driving the same in a counterclockwise direction, Figures 1 and 4, for discharging the load through the opening 70 and chute 71. The sprocket 50 drives the shaft 51 which in turn drives the gear 64 with which it meshes in a reverse direction thus driving the forward auger 57 in a clockwise direction as best seen in Figures 1 and 4 which also moves the crops through 70, 71. The shaft 51 of the forward auger also drives the sprocket 72 which drives the chain 73 which in turn drives the sprockets 75 and 76, the sprocket 78 driving the chain 79 and thus the sprocket 80 and in turn the shaft 81 of the stripper elevator conveyor 85 which has its advance run 85' facing into the wagon box and moving upwardly in order to claw the crops which are advanced thereagainst by the bed conveyor and discharge it over the upper discharge end 85'' thereof into the space S between its discharge end and the front wall 6 and in vertical alignment with the space 12 of the augers. The drive of the elevator conveyor 85 is simultaneous with the drive of the bed conveyor which is through the medium of the crank 92 which is driven by the sprocket 78 and the pitman 93 which reciprocates the arm assembly 95. The driving pawl 97 rotates the ratchet wheel 99 in a clockwise direction, Figures 3 and 4, which as is keyed or drivingly connected to the shaft 18 by the clutch assembly 100 through 103 thus driving the shaft 18 in a clockwise direction, Figures 3 and 4, thus moving the top run 21 of the bed conveyor forwardly and advancing the load. It will be understood that the rear gate 7 is closed under these conditions.

If the operator should decide to discharge the load to the rear he merely disengages the bolt 103 from the arm driven member 101 and the driving member or the ratchet wheel 99 so that the ratchet wheel 99 rotates about the shaft 18 freely and inserts the bolt 103 in a similar opening in the member 113 and wheel 111 at 112 as shown in Figure 3 thus interconnecting the arm assembly 113 which is keyed to the shaft 109 with the ratchet wheel 111 whereupon driving the shaft 17 in a counterclockwise direction and the bed conveyor rearwardly through the open gate 7. The drive for the rear ratchet is through the rod 106.

The chain 79 for the stripper conveyor is preferably disconnected.

What is claimed is:

1. A self-unloading vehicle comprising a box, a bed conveyor on the bottom of the box having first and second discharge ends, a transverse conveyor on the bottom of the box disposed in receiving relation to said first discharge end of said bed conveyor and discharging through an opening in the side of the box, and a stripper elevator conveyor carried between the sides of the box and having a lower pick-up end spaced above said bed conveyor between said first and second discharge ends and defining a limited load passage space therebetween, said stripper elevator conveyor having an upwardly running rectilinear stretch facing into the box and terminating in an upper discharge end disposed in substantially vertically aligned and discharging relation to said transverse conveyor whereby a portion of the material is adapted to be discharged over said stripper elevator conveyor and a portion beneath the stripper elevator conveyor.

2. A self-unloading vehicle comprising a box, a bed conveyor apron extending along the bottom of the box from one end thereof to adjacent its opposite end, a laterally extending trough disposed at said opposite end of said box in receiving relation to the adjacent end of said bed conveyor, said trough communication at one end with a discharge opening through one side of said box, auger means in said trough formed and arranged to move material received in said trough from said bed conveyor through said discharge opening, and said auger means comprising at least one auger having a flight positioned in wiping relation to said adjacent end of said bed conveyor apron to prevent recirculation of material.

3. In an unloading arrangement for a vehicle having a box, a bed conveyor extending along the bottom of the box from one end thereof to adjacent its opposite end; an elevator conveyor having one end adjacent to the opposite end of the box and its opposite end adjacent to one end of the bed conveyor in receiving relation thereto, a laterally extending trough beneath the elevator conveyor and connected to opposite sides of the box and the bottom thereof and disposed in receiving relation to the adjacent end of the bed conveyor and said one end of said elevator conveyor, a pair of augers extending lengthwise in said trough and each having a shaft carried from one side of the box and discharging through an opening in the opposite side of said box in alignment with said trough, driving means for said conveyors and augers and including a power source, a first shaft assembly carried by said box at said opposite end thereof and operatively connected to said power source, a first and second sprockets connected to said shaft assembly and one of said auger shafts respectively, a chain drivingly interconnecting said first and second sprockets, a pair of meshing gears connected to respective auger shafts for driving the other auger from said one auger shaft, a third sprocket connected to said shaft of said one auger, a countershaft carried by a side of said box, fourth and fifth coaxial interconnected sprockets journalled on said countershaft, a chain drivingly interconnecting said third and fourth sprockets, a crank member connected to said fifth sprocket, a pitman connected to said crank member, drive transmitting means for the bed conveyor comprising a shaft element rotatably mounted from the sides of the box and carrying and driving one end of said bed conveyor and including a ratchet wheel connectible with said last-mentioned shaft element, an arm assembly pivoted on said shaft element, a driving pawl carried by said arm assembly in driving relation to said ratchet wheel attendant to pendulation of said arm assembly, said arm assembly connected to said pitman, drive transmitting means for said elevator conveyor including a shaft element rotatably mounted from the sides of the box and carrying and driving one end of said elevator conveyor, and a sixth sprocket connected to said shaft element and chain driven from said fifth sprocket.

4. In a self-unloading vehicle of the type adapted to be powered from the power-take-off of an associated tractor and comprising a wheeled box, a bed conveyor on the bottom of the box and extending from the rear of the box to intermediate the ends thereof and comprising an endless apron, means supporting the ends of the apron from the box and comprising a rear shaft and a front shaft, an apron type of elevator stripper conveyor extending across the front of the box diagonally upwardly from intermediate the ends of said bed conveyor and having a lower end disposed vertically from said bed conveyor to provide a space between the same to pass the last increment of material beneath said lower end of the elevator conveyor, an auger cross conveyor disposed across the forward end of said bed conveyor in receiving relation thereto and to the upper discharge end of said elevator conveyor and discharging through an opening in a side of the box and comprising a trough recessed in the bottom of the box and a plurality of augers arranged extending lengthwise of said trough and comprising shafts supported from a side of said box opposite said discharge opening, drive transmitting means extending from the forward end of the box and terminating in a gear box carried by the vehicle at the forward end of the box, said gear box having an output shaft extending from each side, a drive shaft for the elevator conveyor journalled through the sides of the box, and an operative drive connection between one of said output shafts and said auger shafts and elevator conveyor drive shaft, and a selectively engageable and disengageable drive connection between one of said output shafts and said front and rear bed conveyor apron shafts.

5. In a self-unloading vehicle comprising a box, an apron type bed conveyor carried by the box for moving material in a certain direction, a trough embodied in the bottom of the box at the delivery end of the bed conveyor and communicating at one end with a discharge opening in a side of the box, a pair of augers arranged side by side in the trough and extending crosswise of the bed conveyor, said augers disposed entirely below the level of said bed conveyor and disposed widthwise in extension of said bed conveyor in the delivery direction thereof, and one of said augers disposed partially beneath the adjacent end of said bed conveyor and rotating with an upward sweep on its top side away from the apron of the bed conveyor for wiping off material tending to adhere thereto.

6. In a self-unloading vehicle of the type adapted to be powered from the power take-off of an associated tractor and comprising a wheeled box having a rear discharge opening, a bed conveyor on the bottom of the box and extending from the rear of the box to intermediate the ends thereof and comprising an endless apron, means supporting the ends of the apron and comprising a rear shaft and a front shaft, an apron type of elevator stripper conveyor extending across the forward end of the box diagonally upwardly from intermediate the ends of the bed conveyor and having a lower end disposed vertically from said bed conveyor to provide a space between the same to pass increments of material beneath said lower end of the elevator conveyor, a cross-conveyor disposed across one delivery end of the bed conveyor apron at said forward end of the box and in receiving relationship to the upper discharge end of said elevator stripper conveyor and discharging through a side of the box, said cross-conveyor including a drive shaft journaled from the box, drive transmitting means extending from the forward end of the box and terminating in a gear box carried by the forward portion of the box, said gear box having at least one output shaft, a drive shaft for the elevator conveyor journaled through the sides of the box, and an operative drive connection between said output shaft and said cross-conveyor drive shaft and said elevator conveyor drive shaft, and a selectively engageable and disengageable drive connection between said output shaft and said front and rear shaft of the bed conveyor apron for operating said bed conveyor to discharge forwardly or rearwardly through said rear discharge opening.

References Cited in the file of this patent

UNITED STATES PATENTS

| | | |
|---|---|---|
| 2,321,168 | Tognetti | June 8, 1943 |
| 2,553,484 | Stauch | May 15, 1951 |
| 2,575,639 | Scranton et al. | Nov. 20, 1951 |
| 2,669,368 | Kammueller et al. | Feb. 16, 1954 |
| 2,676,002 | Wolfe | Apr. 20, 1954 |